(12) United States Patent
Barre et al.

(10) Patent No.: US 7,987,709 B2
(45) Date of Patent: Aug. 2, 2011

(54) DEVICE AND METHOD FOR MEASURING THE FLOW SPEED AND DIRECTION OF A GASEOUS FLUID

(75) Inventors: Cyril Barre, Saint Philippe du Seignal (FR); Michel Dos-Reis, Plaisance du Touch (FR); Hervé Magnin, Flourens (FR)

(73) Assignee: Airbus France, Toulouse (FR)

( * ) Notice: Subject to any disclaimer, the term of this patent is extended or adjusted under 35 U.S.C. 154(b) by 58 days.

(21) Appl. No.: 12/525,071

(22) PCT Filed: Jan. 31, 2008

(86) PCT No.: PCT/FR2008/050159
§ 371 (c)(1),
(2), (4) Date: Dec. 9, 2009

(87) PCT Pub. No.: WO2008/104666
PCT Pub. Date: Sep. 4, 2008

(65) Prior Publication Data
US 2010/0089145 A1 Apr. 15, 2010

(30) Foreign Application Priority Data
Feb. 1, 2007 (FR) ...................................... 07 53020

(51) Int. Cl.
G01F 1/68 (2006.01)
(52) U.S. Cl. .................................................... 73/204.11

(58) Field of Classification Search ............... 73/204.11, 73/204.21, 861.65, 861.66, 202
See application file for complete search history.

(56) References Cited

U.S. PATENT DOCUMENTS

| 3,359,794 | A | | 12/1967 | Rosenberg | |
|---|---|---|---|---|---|
| 3,604,261 | A | | 9/1971 | Olin | |
| 4,503,706 | A | | 3/1985 | Kolodjski | |
| 4,912,973 | A | * | 4/1990 | Milewski et al. | 73/202 |
| 5,481,925 | A | * | 1/1996 | Woodbury | 73/861.66 |
| 5,483,839 | A | * | 1/1996 | Meunier | 73/861.66 |
| 6,134,972 | A | * | 10/2000 | Streckert et al. | 73/861.65 |
| 6,237,426 | B1 | * | 5/2001 | Gryc et al. | 73/861.66 |
| 6,957,586 | B2 | * | 10/2005 | Sprague | 73/861.22 |
| 7,243,556 | B2 | * | 7/2007 | Gryc et al. | 73/861.65 |

FOREIGN PATENT DOCUMENTS

| DE | 1 224 546 | 9/1966 |
|---|---|---|
| DE | 89 030 | 4/1972 |

* cited by examiner

*Primary Examiner* — Jewel Thompson
(74) *Attorney, Agent, or Firm* — Patterson Thuente Christensen Pedersen, P.A.

(57) ABSTRACT

A device for measuring the flow speed of a fluid as well as its direction and its orientation, based on a thermal-sensor measurement principle, that comprises at least three flow measurement probes each having a sensitive member and an obstacle masking a predetermined measurement area of the sensor, characterized in that the flow measurement probes are attached on carrier posts, the carrier posts defining the obstacles that form masking members for an angular sector of the flow measurement probes facing the sensitive member of the probes.

18 Claims, 5 Drawing Sheets

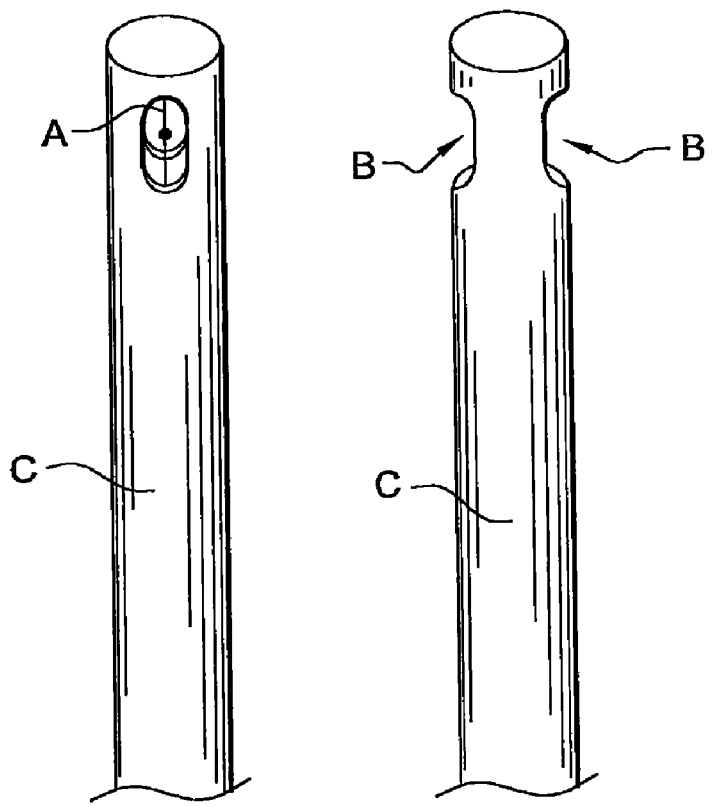
Fig. 1A  Fig. 1B
PRIOR ART
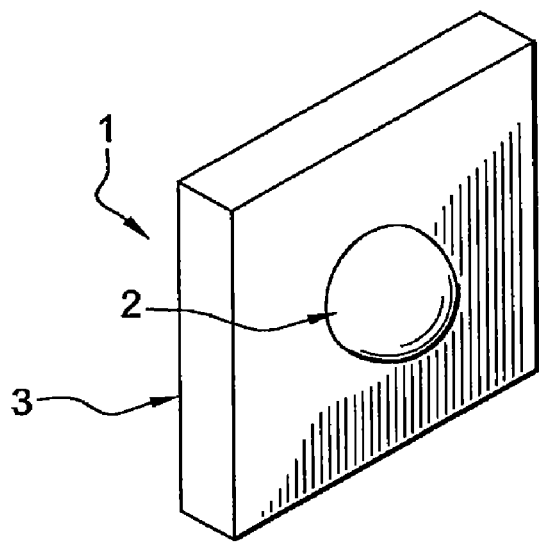
Fig. 2

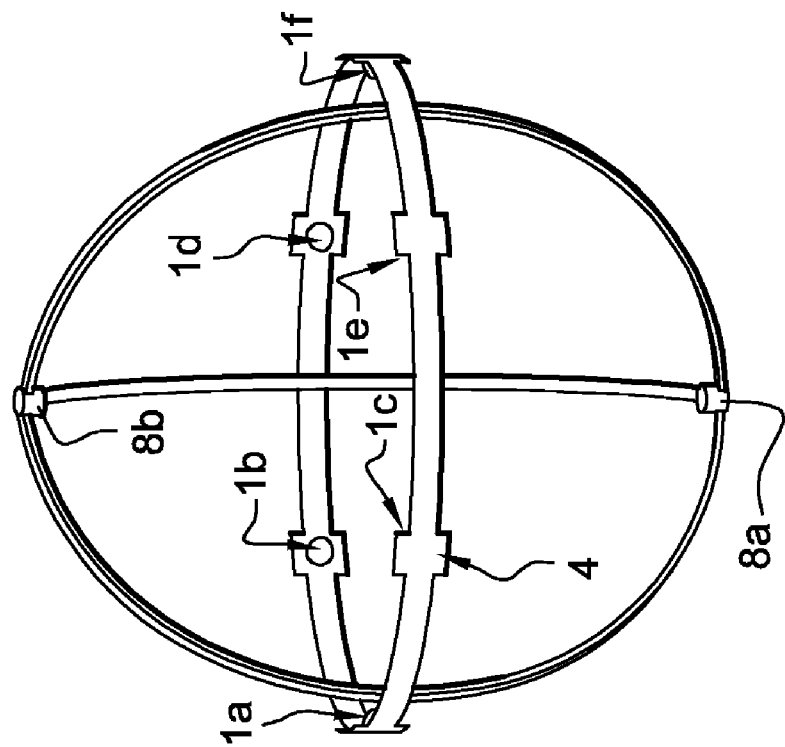
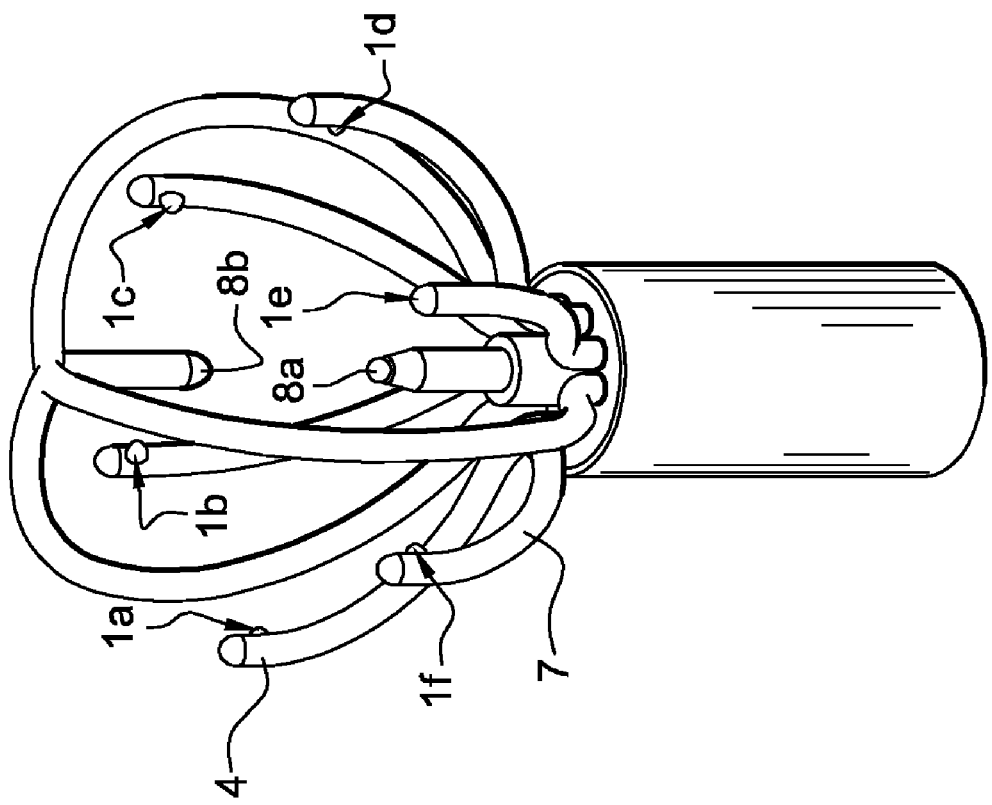

DEVICE AND METHOD FOR MEASURING THE FLOW SPEED AND DIRECTION OF A GASEOUS FLUID

PRIORITY CLAIM

The present application is a national stage entry of PCT Application No. PCT/FR2008/050159, filed Jan. 31, 2008 which claims priority from French Application No. 0753020, filed Feb. 1, 2007, the disclosures of which are hereby incorporated by reference in their entirety.

TECHNICAL FIELD

The invention relates to a device and measurement procedure for speed, direction and orientation of a gaseous fluid, such as air.

BACKGROUND

Existing devices and measurement procedures of air flow speed use multiple technologies. Among the most widespread are Pitot Tube-type anemometers with pressure sensors, those with propellers, thermal anemometers, and more recently ultrasound sensors.

Pitot Tube technology relies on a measure of differential pressure between the total pressure and the static pressure of a flow. This differential pressure is proportional to the dynamic pressure ($\Delta P = \alpha * \frac{1}{2} * \rho * V^2$), where V is the speed of gaseous flow. Pitot Tubes are particularly adapted to high speeds even if the quality of the measurement is very sensitive to the direction of the flow.

For devices with propellers or turbines located in an airflow, the speed of the flow is determined by the rotational speed of the rotary element. These devices can provide a very precise measurement for average speeds and when the flow is directed along their rotational axis. Mechanical wear due to the propeller's rotational movements as well as the loss of charge generated are the principal disadvantages of these devices.

Another known device is the hot wire device for which the measurement process takes place by the measurement of a current intended to maintain the temperature of a wire cooled by an air flow and the comparison of the value of this current with a nominal temperature value obtained without air flow.

Thermal anemometers use the temperature of a sensing element that can be regulated by current, by temperature or by constant temperature differential. The regulation is the image of the flow speed. They allow measurement of very weak flows such as drafts and are, for this reason, well-adapted to use in air conditioning and ventilation.

An example of a constant temperature anemometer is provided by the document U.S. Pat. No. 4,503,706.

The hot wire device can be omni-directional, but in this case it gives no indication of the direction of the airflow, or it can be streamlined to favor one measurement direction and be capable of measuring, in this case, a flow along to a reduced angular sector.

Even if certain ones allow for the complete determination of a flow's directional characteristics, the different technologies presented above do not allow for the exploration of more than a small angular sector.

SUMMARY

The invention proposes embodiments of a device and a measurement procedure for flow of a gaseous fluid like air, adapted to carry out the measurement of flow speed, direction, and orientation along the widest possible, if not quasi-spherical, distribution of sensors.

Embodiments allow measurement of the three directional components in space of a flow at the widest possible angular, if not spherical, section, the measurement necessarily covering the widest possible solid angle, and the widest possible temperature scale. One embodiment relates to a static probe device, compact in size, of reduced weight with no moving parts. The device can thus be used in confined spaces and can be embedded onto an aircraft.

Embodiments relate to a measurement device for a fluid's speed, direction, and orientation based on the measurement principle of thermal sensors, wherein the device comprises at least two flow measurement probes, each comprising a sensor element and an obstacle masking a determined measurement zone of the sensor element.

In an embodiment, the obstacles are constituted by masking elements of an angular sector of flow measurement probes with regard to the sensing element of the probes.

By an advantageous production design of an embodiment, the measurement device is comprises a spherical envelope, and the flow measurement probes are arranged on at least one circular generating line of the envelope of the measurement device and covering complementary angular sectors.

More specifically, the flow measurement probes are located on the equatorial plane of the measurement device in an embodiment.

The device can comprise four flow measurement probes placed at 90° angles from one another along a common circular generating line to define four cardinal points.

According to a one embodiment, the device comprises six flow measurement probes located 60° from one another on a circular generating line to create at least two measurement sectors towards the wind flow and two measurement sectors below the wind flow.

According to another embodiment, the device comprises four sensors on the equator of the device envelope and four sensors on at least one tropic of the envelope.

According to an embodiment, the masking elements are located on the outside of a circle defined by a generating circular line or lines.

In an embodiment, the device is also additionally made up of measurement probes located on the envelope's polar axis.

According to a production design of an embodiment, the flow measurement probes are fixed on bearing masts and these bearing masts can constitute the masking obstacles in question.

According to an embodiment, the bearing masts can comprise ring segments distributed along equidistant meridians of the spherical volume defined by the envelope of the device.

In this framework and according to a production design of an embodiment, the flow measurement probes are arranged on bearing masts in the form of polar rings defining a spherical volume, the probes being located inside of the rings on the equatorial line of the spherical volume.

Furthermore, according to the an embodiment, the device can be such that the sensing elements are arrayed on a ball constituting a common obstacle for all of the aforementioned flow measurement probes.

According to a design mode of an embodiment, the device comprises a temperature and pressure sensor in order to compensate the measurements.

In the framework of an embodiment, the sensors are, specifically, probes with resistant thermal sensitive elements regulated by current, by temperature or by differential from constant temperature.

Moreover, an embodiment relates to a measurement process for speed, direction and orientation of liquid gas flow by means of the invention's device, the process comprising comparing the flow measurement probe sensors' responses by a calculator so as to simultaneously evaluate the three vectored components of flow speed according to an angular sector of the greatest possible width.

The process is such that overall measurements taken by the devices' measurements of potential are digitized and transmitted to a calculator that compares values sent out by the sensors in an embodiment.

More specifically, on the basis of the sensors' independence from one another, the process is such that the sensors used to determine the flow speed can be selected in an embodiment.

More specifically, the sensors being thermistors whose resistance varies with temperature, the process is such that two elements of the flow speed are determined by seeking which thermistor registers the highest temperature in an embodiment.

In an embodiment, the theoretical determination of the flow characteristics brings in one or more calculating algorithms, such as orientation, direction, and module, on the basis of input provided by the measurement probes.

The process is such that an air current's angle of incidence on the device can be determined by a calculation section containing a data table based on the incidences by comparison with information provided by the sensors and the table of recorded data in an embodiment.

BRIEF DESCRIPTION OF THE DRAWINGS

Other characteristics and advantages of the measurement device and process will be brought out in the reading of the following description of non-limiting production embodiments accompanied by drawings in which:

FIGS. 1A and 1B depict an example of a hot wire speed probe from front and side according to an embodiment.

FIG. 2 depicts a perspective view of a sensing element and an example of an obstacle according to an embodiment.

FIGS. 6, 7, 8, 9, and 10 are perspective views of five examples of production designs of devices according to embodiments.

DETAILED DESCRIPTION

FIGS. 1A and 1B illustrate a hot wire airflow speed measurement device from streamlined prior art that favors a directional measurement.

In this device, the hot wire sensor A provided with a thermistor is placed inside of a tube C provided with two openings B symmetrical to the axis of the tube.

As explained above, such a device is only suitable to measure flow along a reduced angular sector corresponding more or less to the axis of openings B.

The fluid speed, directional, and orientation device according to embodiments of the invention, based on a principle of measurement by thermal sensors, comprises at least two flow measuring probes, each integrating a sensing element 2 and an obstacle 3 masking a measurement zone of the sensing element as depicted in FIG. 2.

The principle of the orientation and direction of air-flow according to the device lies in the partial masking of each of the device's thermistors.

The principle of the orientation and direction of air-flow, according to the device, lies in the principle of making directional, by their spatial array, a combination of sensing elements.

The directional sensitivity of these elements is made possible by the presence of obstacles that can be of various sorts. A solid obstacle placed in a flow plays the role of a stopping point where V=0 at the impact point and forms a wake behind it where flow characteristics, and notably its speed, are modified. An insulating paint may equally be applied directly on the sensing element and thus mask a sector of measurement.

The device is thus adapted to measure all three vectored components of flow speed on a wide angular sector and a wide range of temperatures.

It can be used for tests in flight on an aircraft and its compactness permits measurement of flow in hard to access zones such as, for example, connecting zones of shutters to the airfoil.

Figure 3A:
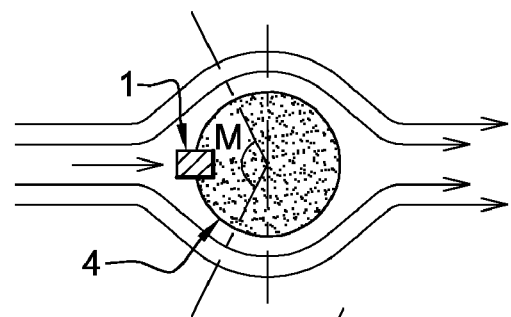
FIGS. 3A and 3B depict two overhead cutaway sectional views of a design of the sensor and obstacle configuration in airflows according to an embodiment.
Figure 3B:
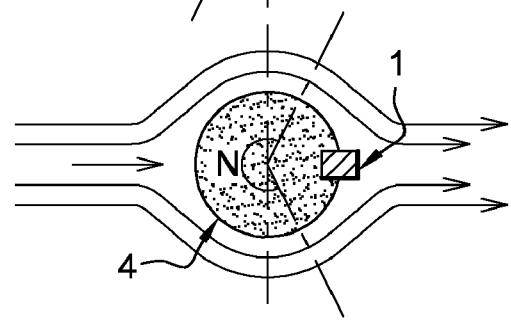

A representation of flow for a sensing element is provided in FIGS. 3A and 3B. FIG. 3A corresponds to a flow directed toward the sensing element and FIG. 3B to a flow where an obstacle masks the sensing element.

The measuring range of the sensing element corresponds to the sector defined by the angle M in FIG. 3A whereas the masking range corresponds to the sector defined by angle N in FIG. 3B.

Obstacles 3 constitute masking elements 4 of an angular sector of flow measurement probes with regard to the sensing elements of the probes.

Thus, according to the direction of the gaseous flow whose properties one wants to measure, each sensing element is subjected in a different way to the influences of this flow.

Sensing elements are oriented so that the overall combination of the reactions of each sensor allows simultaneous evaluation of the three vectored components of air speed over a wide angular sector and a wide range of temperatures.

As for the speed module, it is evaluated by a probe capable of being omni-directional in certain modes of production.

The theoretical determination of flow characteristics can bring into play one or more calculating algorithms for flow orientation, direction and speed, beginning with data provided by the measurement probes.

This operation for determining the airflow's angle of incidence on the device can also be done on the basis of a data table according to incidences.

This table is composed during a calibration phase for each sensor, which comprises placing the device in a wind tunnel and doing a sweep of overall incidences in three dimensions at a fixed rate of speed.

Determination of the angle of incidence is then done by comparison of the input obtained from the thermistors with the table of recorded data.

Several production configurations of embodiments of the invention are foreseeable. The geometrical criteria and the associated technologies can evolve according to the solution sought.

Figure 5:
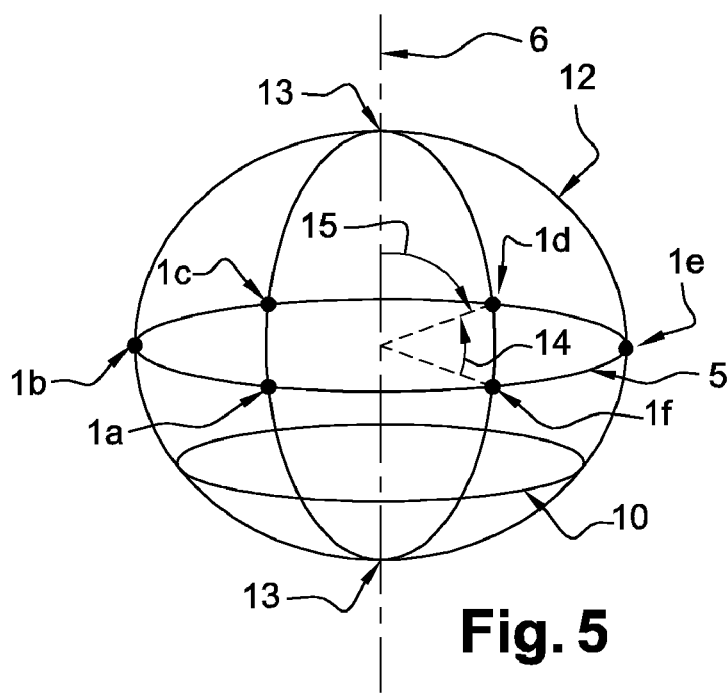
FIG. 5 is a schematic perspective view of a measurement device according to a first example configuration of an embodiment.

According to FIG. 5, the flow measurement probes 1a, . . . , 1f are arranged on a common circular generating line 5 and cover complimentary angular sectors.

According to an initial production design, the device can include four flow measurement probes arrayed 90° from one another along the circular generating line 5 to define four cardinal points and 2 polar probes 8a and 8b are located at the poles 13. As illustrated in FIGS. 5, 6, 7, and 8, the device can be composed of 6 flow measurement probes 1a . . . , 1f arrayed 60° apart along the circular generative line 5 to create at least two measurement sectors towards the wind flow and two measurement sectors below the wind flow. Such a configuration allows, moreover, for measurement zone coverage so as to avoid the existence of blind zones.

Figure 4:
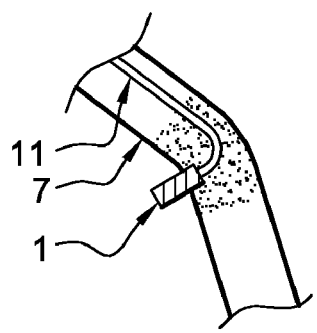
FIG. 4 depicts a schematic cut-away detail view of the positioning of the flow measurement probe according to an embodiment.

As shown in FIG. 4, flow measurement probes 1 are attached to bearing masts 7 serving as obstacles to the flow. These masts can comprise a tube within which pass the power cables 11. Sensing elements are inserted into the holes made in the bearing masts 7 and extending from these masts by a distance adapted in order to optimize its masking sector.

Bearing masts are, for example, tubes about 1 mm. in diameter, the device having to be of a total diameter on the order of about 25 mm.

Following the example of FIG. 6, bearing masts 7 are constituted by ring segments distributed according to equidistant meridians 12 of a spherical volume. Probe 8a is supported by a trihedron.

FIG. 7 depicts a device comprising an equatorial ring support to which are attached flow measurement probe sensors and for which probes 8a and 8b are placed in proximity to the poles 13 of a single polar hooping.

Figure 8:
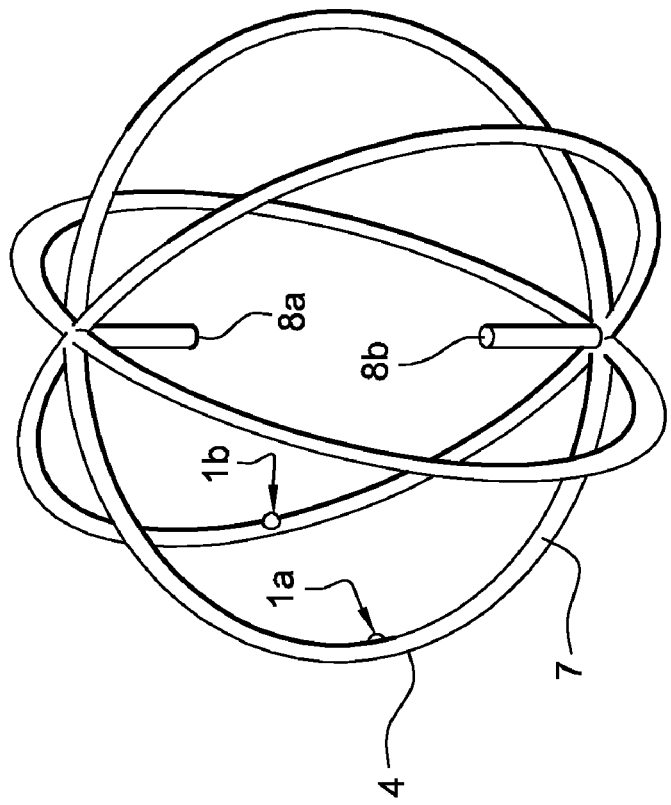

According to FIG. 8, flow measurement probes 1a . . . , 1f are arrayed on the bearing masts in the form of polar rings defining a spherical volume, the probes being arrayed on the inside of the rings on an equatorial line of the spherical volume.

Figure 9:
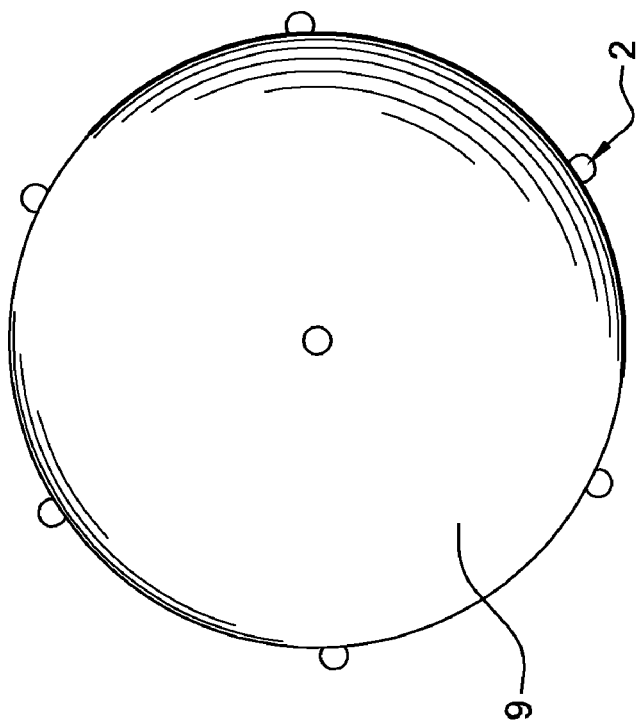

The example of FIG. 9 is production design embodiment for which sensing elements 2 are arrayed on a ball 9 constituting a common obstacle for said flow measurement probes. This example requires a greater number of sensors due to the fact that the ball's volume constitutes a large obstacle limiting the measurement zones of the sensors even more.

Figure 10:
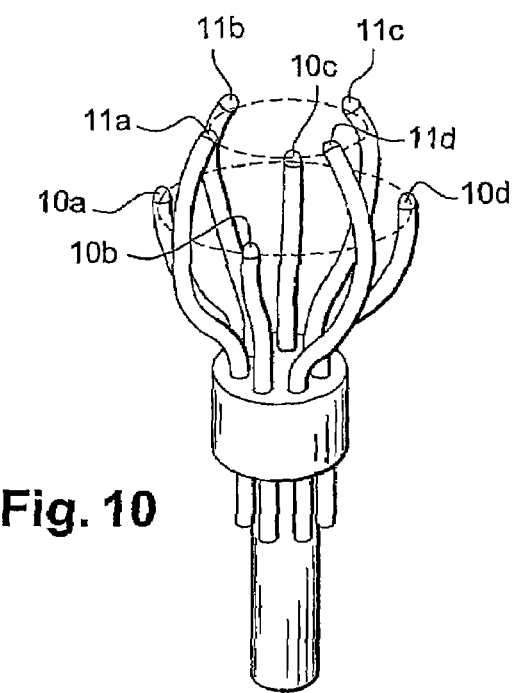

FIG. 10 depicts a production design for which a series of four sensors 10a to 10d are arrayed on the equatorial circle of the spherical envelope defining the volume of the device while four other sensors 11a to 11d are arrayed on a tropical line 10 of said envelope. This production design does not require polar probes.

Whatever the production design may be, the number of measuring elements is a function of the desired accuracy and sensitivity.

Measuring probes are elements termed resistant where the internal resistance of the element varies according to its temperature in embodiments. CTNs and CTPs (thermistor with negative or positive temperature coefficients), PT100, and PT1000 are non-limiting examples.

To carry out flow measurement, sensors are attached to power devices of varying sorts. For a constant current power source, the airflow, depending on its intensity, lowers more or less the temperature of the sensing element to the terminals of which the potential is measured.

For constant temperature operation, the resistance of each sensing element is kept constant by a power servo-control. This regulation is proportional to the flow speed.

Finally, one can power the device so as to obtain a constant temperature differential between the measurement element and the surroundings by an associated compensating probe.

The embodiment of the device schematized in FIG. 5 is shown in FIG. 6 and is described in greater detail below.

All sensing elements are supplied with constant current in an embodiment. The temperature and internal resistance of these elements vary according to exposure to flow. Measurement is carried out by a reading of potential at the terminals of these resisting elements. It is equally possible to adjust the current supplied according to the ambient operational temperature. Typically, the current supplied increases with the ambient temperature.

Probes 1a . . . , 1f, termed meridian, allow evaluation prior to any angle of rotation 14 along the probe's polar axis 6 as shown in FIG. 5. They can equally be used to supplement probes 8a and 8b arrayed on the polar axis 6 located on FIG. 5 so as to complete readings on flow direction by giving its pitch or elevation 15 in relation to the device's equatorial level plane 5.

The free ends of the bearing masts are shrouded to limit flow disturbance that they generate near flow measurement probes.

The determination method is based on a principle of comparison of data supplied by each sensing element, which are in this case CTNs.

When the airflow attacks the device, the CTNs located facing the flow are cooled more than those located behind an obstacle like the bearing masts. The measurement of values given by the probes allows one to arrive in a bijective manner at the direction of an airflow reaching the probe depending on whether the CTNs are more or less hidden by an obstacle.

To carry out flow measurement, the CTNs are connected to a measurement device comprised of one constant current generator per CTN and an electrical potential measurement device to the ends of each one.

The overall measurements carried out by the devices are digitized and sent to a calculator that analyzes this data.

This operation to determine the angle of incidence of an airflow on the device can also be done by a calculation containing a table of data in function of incidences.

This table of data is populated during a calibration stage for each sensor that comprises placing the device in a wind tunnel and doing a sweep of the overall incidences in three dimensions at a fixed speed.

The determination of the angle of incidence is then done by comparing input provided by the thermistors with the table of recorded data.

Figure 11:
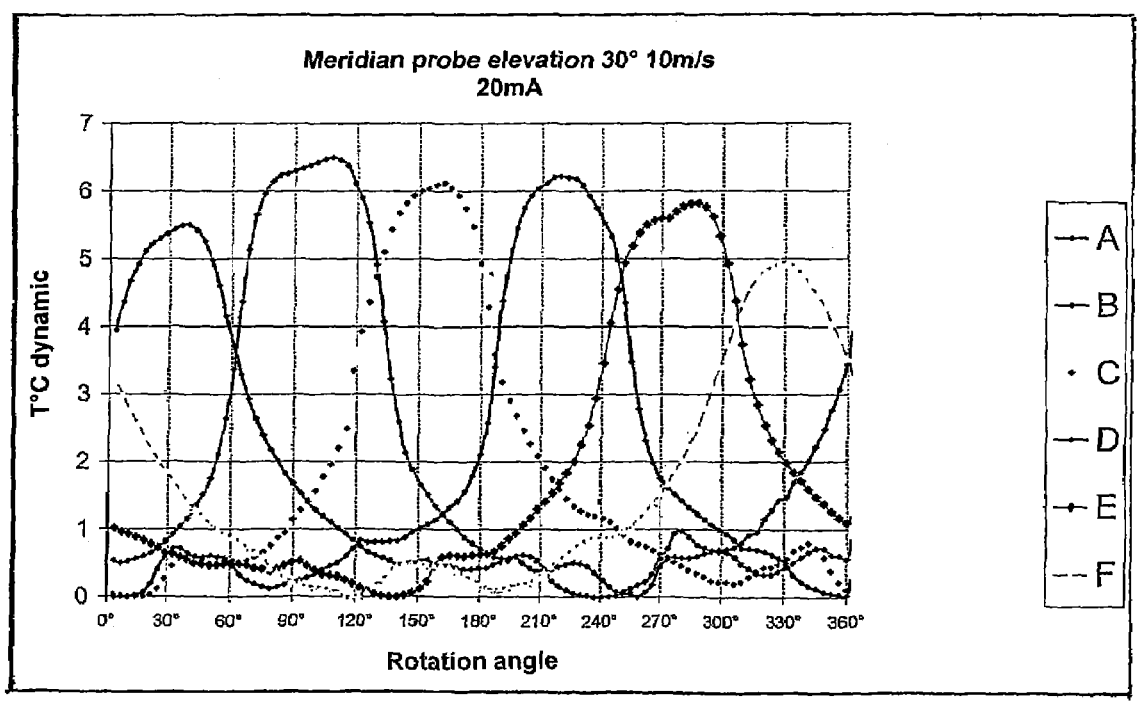
FIG. 11 depicts measurement curves generated by the device of FIG. 6.

An example of a meridian CTN response curve 1a, . . . , 1f by a device with six meridian probes of FIG. 6 is shown in FIG. 11 as a function of directional flow. The graph represents input of the six meridian CTNs over a complete rotation for a given angle of elevation and a given speed, here 30 degrees and 10 m.s$^{-1}$. This curve is used to determine the rotational angle 14 of the flow.

For that purpose, the input from the six meridian CTNs is examined at a fixed angular position to find the hottest CTN. After isolating the sensors on which the calculations will be made, an algorithm is developed to determine the rotation angle.

Elevation angle 15 is evaluated by an algorithm applied essentially to the input from polar sensors 8a and 8b. The data supplied by the meridian probes can complete this data.

The speed module is determined by a probe capable, in certain production designs, of being omni-directional.

The expected precision is on an order of ±10% on the speed module, ±15° on the rotation angle and ±30° on the elevation angle. Rotation is covered over 360° whereas the elevation band is located between 0° and 120°, or a solid angle of 3 π.

The device can include an absolute pressure sensor as well as a temperature sensor in embodiments. In fact, gaseous fluid properties like density or the coefficient of convective transfer for example, depend on these physical sizes and influence the results. It is therefore necessary to take the evolution of surrounding conditions into account in order to compensate the measurements.

The invention is not limited to the examples shown. Furthermore, a configuration for which the sensors are otherwise organized, and notable for which the four initial sensors are arrayed on one tropic and four secondary sensors are arrayed on a second tropic, remains within the framework of the invention in question.

The invention claimed is:

1. A speed flow, direction, and orientation measurement device based on a principle of thermal measuring sensors, comprising:
a plurality of flow measurement probes each including a sensing element and an obstacle masking a determined zone of the sensing element, wherein the plurality of flow measurement probes are attached to bearing masts forming the obstacles forming masking elements of an angular sector of the plurality of flow measurement probes with respect to the sensing element of each of the plurality of probes.

2. The device of claim 1, wherein the measurement device comprises a spherical envelope, and wherein the plurality of flow measurement probes are arrayed along at least one circular generating line of the envelope and cover complimentary angular sectors.

3. The device of claim 2, wherein the plurality of flow measurement probes are located on an equatorial plane of the measurement device.

4. The device of claim 2, comprising four flow measurement probes located 90° from one another on a common circular generating line to define four cardinal points.

5. The device of claim 2, comprising six flow measurement probes located 60° from one another on a circular generating line to create at least two measurement sectors in a flow stream and two sectors below a flow stream.

6. The device of claim 2, comprising four sensors on an equator of the envelope and four sensors on at least one tropic of the envelope.

7. The device of claim 2, wherein the masking elements are arrayed on an outside of a circle defined by at least one circular generating line.

8. The device of claim 2, further comprising at least two measurement probes arrayed on a polar axis of the envelope.

9. The device of claim 2, wherein the bearing masts comprise ring segments arrayed according to equidistant meridians of a spherical volume of the envelope.

10. The device of claim 1, wherein the plurality of flow measurement probes are arrayed on bearing masts in the form of polar rings defining a spherical volume, the plurality of flow measurement probes being arrayed on an inside of the rings on an equatorial line of the spherical volume.

11. The device of claim 1, further comprising a pressure and temperature sensor configured to compensate measurements of fluid flow speed, direction and orientation of the plurality of flow measurement probes.

12. The device of claim 6, wherein the sensors are probes with resistant thermal sensors regulated by one of current, temperature, or differential from a constant temperature.

13. A measurement process of flow direction, orientation and speed of a gaseous fluid comprising:
forming a device comprising a plurality of flow measurement probes each including a sensing element and an obstacle masking a determined zone of the sensing element, wherein the plurality of flow measurement probes are attached to bearing masts forming the obstacles forming masking elements of an angular sector of the plurality of flow measurement probes with respect to the sensing element of each of the plurality of probes; and
comparing inputs of sensors of the plurality of flow measurement probes by a calculator to simultaneously evaluate three vectored components of flow speed according to a widest possible angular sector.

14. The process of claim 13, further comprising digitizing overall measurements made by the flow measurement probes; and sending the digitized measurements to a calculator that compares values transmitted by the sensors.

15. The process of claim 13, wherein, on the basis of an isolation of the sensors, the sensors used for measurement of flow speed are selected.

16. The process of claim 13, wherein the sensors are thermistors, and two components of flow speed are determined by seeking the thermistor with the highest temperature.

17. The process of claim 13, wherein flow characteristics are determined by one or more calculating algorithms on the basis of input given by the flow measurement probes.

18. The process of claim 13, wherein an angle of incidence of an air flow on the device is determined by a calculation which contains a data table in function of incidences by comparison of data furnished by the sensors with the data table.

* * * * *